United States Patent
Zhang et al.

(10) Patent No.: US 7,581,008 B2
(45) Date of Patent: Aug. 25, 2009

(54) SYSTEM AND METHOD FOR ALLOCATING SERVER RESOURCES

(75) Inventors: Alex Zhang, Mountain View, CA (US); Cipriano A. Santos, Modesto, CA (US); Dirk M. Beyer, Walnut Creek, CA (US); Hsiu-Khuem Tang, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1018 days.

(21) Appl. No.: 10/706,401

(22) Filed: Nov. 12, 2003

(65) Prior Publication Data

US 2005/0102398 A1  May 12, 2005

(51) Int. Cl.
*G06F 15/173* (2006.01)

(52) U.S. Cl. .................. 709/226; 709/203; 709/223; 709/224; 703/2

(58) Field of Classification Search .......... 709/223, 709/224, 226, 229, 201, 203; 703/2, 23
See application file for complete search history.

(56) References Cited

U.S. PATENT DOCUMENTS

| | | | |
|---|---|---|---|
| 6,065,062 A * | 5/2000 | Periasamy et al. ......... 709/227 |
| 6,226,377 B1 * | 5/2001 | Donaghue, Jr. ............. 709/201 |
| 6,230,183 B1 * | 5/2001 | Yocom et al. .............. 718/105 |
| 6,374,297 B1 * | 4/2002 | Wolf et al. ................. 709/226 |
| 6,571,283 B1 * | 5/2003 | Smorodinsky ............. 709/221 |
| 6,816,905 B1 * | 11/2004 | Sheets et al. ............... 709/226 |
| 6,859,929 B1 * | 2/2005 | Smorodinsky ............. 718/105 |
| 6,862,623 B1 * | 3/2005 | Odhner et al. ............. 709/226 |
| 7,451,183 B2 * | 11/2008 | Romero et al. ............. 709/224 |
| 2004/0010544 A1 * | 1/2004 | Slater et al. ................ 709/203 |
| 2004/0205219 A1 * | 10/2004 | Li et al. .................... 709/231 |
| 2005/0033794 A1 * | 2/2005 | Aridor et al. .............. 709/200 |
| 2005/0102398 A1 * | 5/2005 | Zhang et al. ............... 709/225 |

* cited by examiner

*Primary Examiner*—Ramy M Osman

(57) ABSTRACT

A system and method employing an allocation process for determining the number of server machines at each tier of a multiple tiered server system. The allocation process evaluates the number of server machines at each tier sufficient to achieve an average response time of a transaction request to be processed by the server system in response to changes in the average number of transaction requests. The allocation process also identifies shadow pricing enabling analysis of the cost associated with incremental changes in the average response time or other critical system resources.

14 Claims, 7 Drawing Sheets

SYSTEM AND METHOD FOR ALLOCATING SERVER RESOURCES

CROSS-REFERENCES TO RELATED APPLICATIONS

This application is related to commonly assigned patent application entitled "Resource Allocation for Multiple Applications" by Garg et al, application Ser. No. 10/624,318, filed Jul. 22, 2003.

BACKGROUND OF THE INVENTION

In large, horizontally scalable, multi-tiered server systems, system operators often need to dynamically allocate an adequate number of server machines to each tier to meet user needs. A server system, which may be part of a server farm, is a group of server machines, or computers, that work together as a single system and present the appearance of a single server to a client. The server farm may comprise many such server systems together with a server pool that provides spare server machines should one or more of the server systems require additional resources.

System operators often use trial and error to determine how many server machines to allocate to each layer or tier of the server system. Clearly, trial and error methods to determine how many server machines must be allocated to meet user demand is inefficient and often the contracting party must pay for excess capacity that it does not actually need. At other times, system level performance will degrade because too few resources are available to meet the demand.

System operators also rely on time-consuming simulations (an indirect measure) of the system's response time to determine whether the Service Level Agreement (SLA) requirements are being met. While simulating the server system for a given level of transaction requests, provides a reasonably accurate allocation scheme, simulation, is computationally expensive and lacks system-wide optimization, again making it less than ideal for quickly determining a feasible and optimal resource allocation scheme. Thus, simulation is an impractical means to allocate machines quickly and efficiently when demand changes.

Both the trial-and-error method and the simulation method require human intervention to decide whether to add (or delete) machines. Unfortunately, in a multiple tier server system there are numerous possible "places" to add or delete machines, making it impractical to achieve optimal allocation.

SUMMARY OF EMBODIMENTS OF THE INVENTION

Embodiments of the present invention provide a server system comprising at least one scaleable tier of server machines, means for computing an average response time for the server system to respond to at least one transaction request, and means for allocating an optimized number of server machines for each tier of server machines such that the average response time for the at least one transaction request is less than or equal to a specified average response time.

Embodiments of the present invention also provide a method for determining an optimum allocation of servers operable in a scalable server system having a plurality of tiers. The method may comprise determining queuing time for a plurality of transaction requests, determining a cost-optimized number of server machines for each tier of the server machines, and allocating server machines to each tier of the server system in accordance with the cost-optimized number.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only and not by way of any limitation.

DETAILED DESCRIPTION OF EMBODIMENTS OF THE INVENTION

In the description herein of embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Embodiments of the present invention relate to the dynamic provisioning of computer resources, and, more specifically, to the allocation of server machines in a server system to meet a prescribed service level of average response time. A machine allocation procedure is provided that may minimize total operating cost, and enables the dynamic allocation of server machines at each tier in response to changes in system utilization or increases in the average number of transaction requests. The allocation process for embodiments of the present invention identifies shadow pricing enabling analysis of the cost associated with incremental changes in the average response time or other critical system resources.

Embodiments of the present invention provide a predictive model for determining the response time of a tiered, open queuing network of multiple servers configured in a server system having a processor-sharing queue with a single critical resource, such as the CPU cycle.

Figure 1:
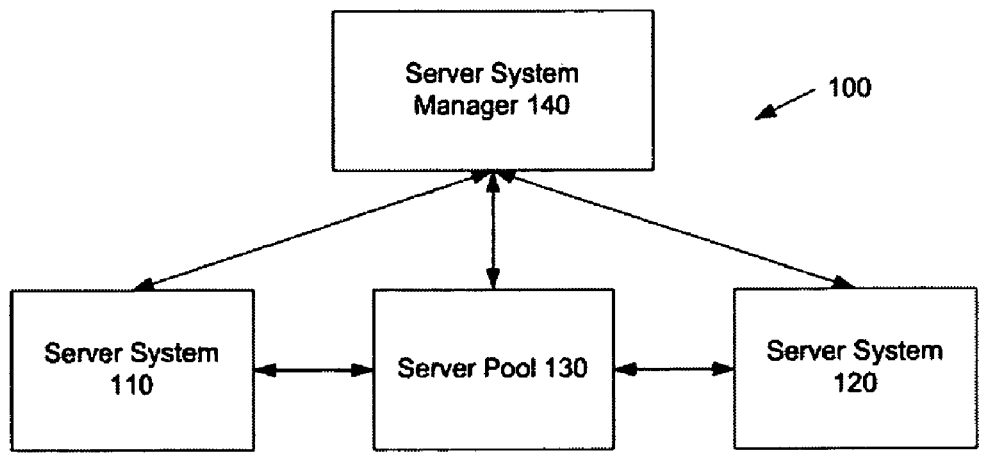
FIG. 1 is a block diagram of an exemplary server farm in accordance with an embodiment of the present invention.

Referring now to the drawings more particularly by reference numbers, a block diagram of an exemplary server farm 100 in accordance with an embodiment of the present invention is shown in FIG. 1. The server farm 100 comprises a plurality of server systems 110 and 120, a server pool 130 and a server system manager 110. Although only two server systems 110 and 120 are illustrated, it is to be understood that many such independent server systems may be part of the server farm 100 and the present invention is not to be limited to a specific number of server systems.

The server systems 110 and 120 preferably comprise a tiered structure having multiple tiers with either two or three tiers being preferred. In an exemplary multi-tier server system and as further explained hereinafter when referencing FIGS. 3A and 3B, the first tier comprises a cluster of web servers to receive transaction requests and to serve web pages to remote clients. The second tier comprises a group of application servers configured to execute application programs such as accounting, order processing, inventory control, or entertainment applications by way of example. The third tier comprises high-end servers that execute database application software.

Server pool 130 comprises a plurality of spare computers that may be allocated to either server system 110 or 120 when the average transaction requests increase. On the other hand, if the average transaction requests decrease, server machines from one or more of the tiers may be returned to the server pool 130. Thus, the server pool 130 may comprise spare resources for each tier that may be allocated when the need arises.

Server system manager 140 comprises a computer system configured to monitor and manage each server system 110 and 120. When increased transaction requests are detected, server system manager 140 calculates a feasible and optimal allocation of resources and either automatically allocates servers to the appropriate tier or generates an alert for the system operators that advises where resources are to be added or removed.

Figure 2:
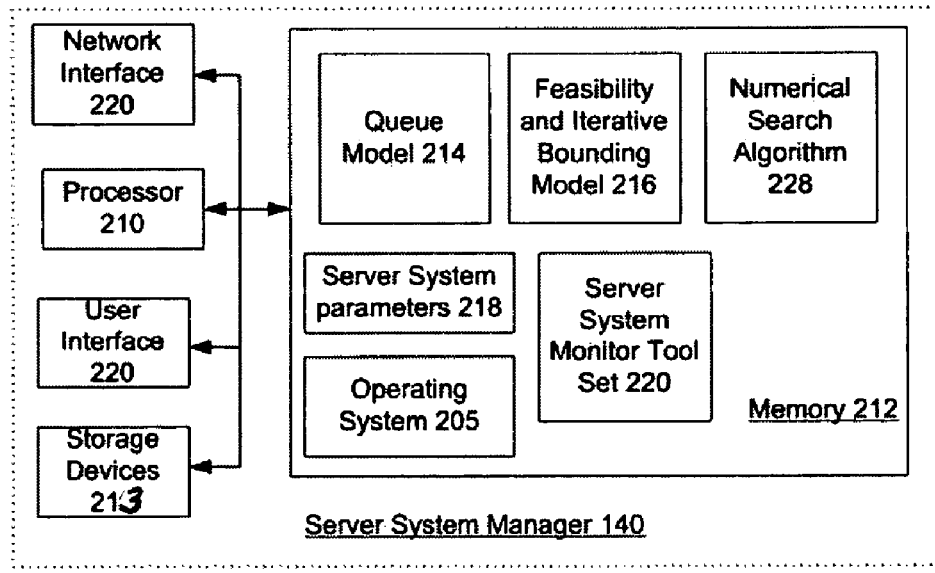
FIG. 2 is a block diagram of network management system in accordance with an embodiment of the present invention.

Referring now FIG. 2, there is seen a block diagram of server system manager 140 in accordance with an embodiment of the present invention. Server system manager 140 may comprise electrically coupled hardware and software elements including an operating system 205, at least one processor 210, memory 212, storage devices 214, user interface devices 216, which may include a display and input devices such as keyboard and pointer devices.

An operating system 205 may be a multi-task operating system that is capable of supporting multiple applications. Thus, the operating system 205 may include various operating systems and/or data processing systems. By way of example only, the operating system 205 may be a Windows brand operating system sold by Microsoft Corporation, such as Windows 95, Windows CE, Windows NT, Windows Office XP, or any derivative version of the Windows family of operating systems. The server system manager 140 and its associated operating system 205 may be configured to support after-market peripherals including both hardware and software components.

Memory 212 may be any suitable type of memory, including non-volatile memory and high-speed volatile memory. As illustrated in FIG. 2, the ability to compute the optimal number of servers to allocate to each tier of the server system together with operating system 205 may be embedded as software or firmware programs stored in memory 212 and may execute on the processor 210.

More specifically, server monitor tool 220 may be resident in memory 212 and may be utilized by processor 210 to monitor the status of each server system 110 and 120. Monitor tool 220 receives data, selected in accordance with engineering considerations, from each server machine of each server system 110 and 120. The data is stored in a system parameter region 218 of memory 222 or in storage devices 213.

A plurality of allocation code modules 214-228 are also resident in memory 212 and executed by processor 210. A code module 214 comprises a queuing model that uses data stored in region 218 of memory 212 to compute the average time that transaction requests are pending at each tier of each server system 110 and 120. The code module 216 comprises a feasibility test and iterative bounding model that uses the output of the queuing model 214 to compute a range on the number of servers that provide a feasible allocation of servers at each tier of the server systems. The code module 228 comprises a numerical search algorithm that uses the output of the iterative bounding model to compute an optimized number of servers at each tier of the server systems.

Figure 3A:
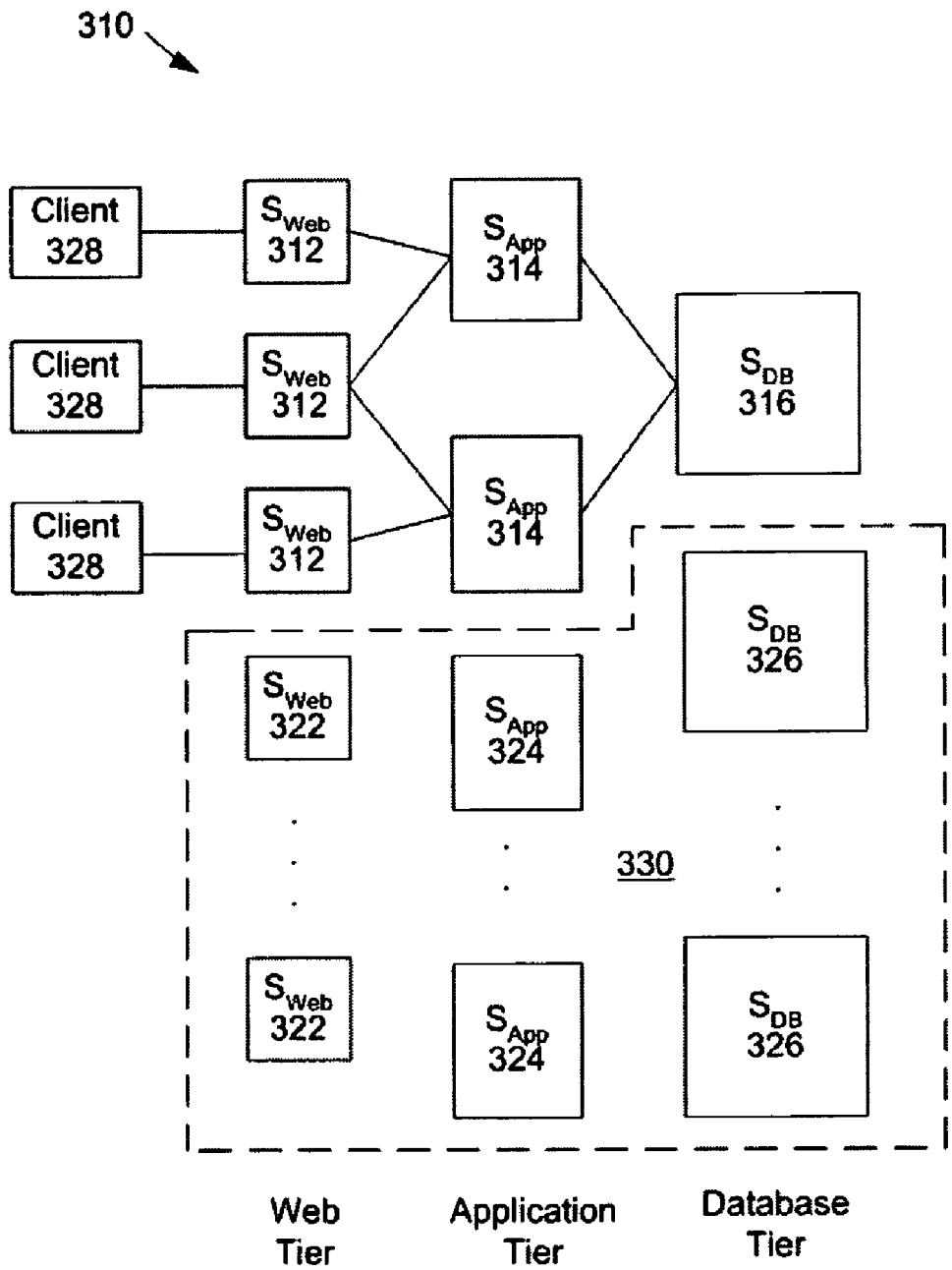
FIGS. 3A and 3B are block diagrams of exemplary feasible multiple tier server systems in accordance with an embodiment of the present invention.
Figure 3B:
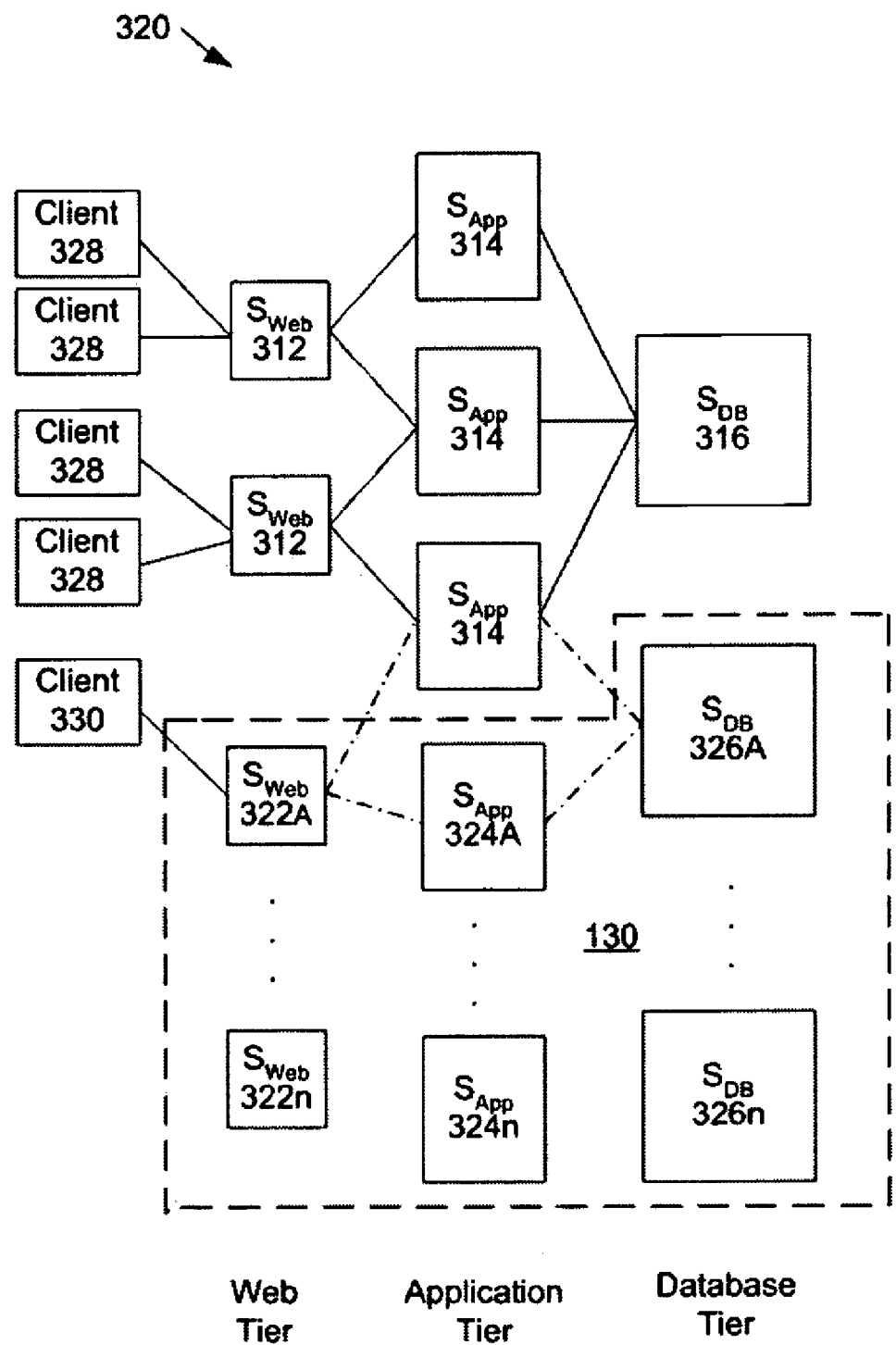

Referring now to FIGS. 3A and 3B, there is seen functional block diagrams of multiple tier server systems 310 and 320, respectively. FIG. 3A illustrates an example of a common three-tier server system such as may be operated by a system operator as a resource for contracting parties, such as Utility Data Centers (UDCs) or Application Service Providers (ASPs). Server system 310 has a tier of web servers 312, a tier of application servers 314 and a tier of database servers 316. Additional servers are available from a pool of server machines generally designated at 130. Although the present invention is well suited for a number of different configurations of a server system, one skilled in the art will appreciate that other configurations may be desirable for specific applications.

Typically, a contractual relationship exists between the system operator and the contracting parties with the contractual terms set forth in a Service Level Agreement (SLA). The SLA often specifies, inter alia, performance parameters such as 95% of the response times to transaction requests must be less than one second. Average response time is important because for many ASP and UDC operators a long response time will result in a decrease in efficiency and customer satisfaction. The average response time is the server side average response time for all requests or more specifically, refers to the time it takes transaction requests to go through the tiered server system. Thus, the average response time is the sum of response times at each tier.

Depending on system utilization factors and the type of requests, the server system of FIG. 3B may provide a better average response time but at a higher cost. As used herein, the average response time is the sum of response times for each tier and the SLA requirement can be met by allocating a different number of computer servers at each tier.

As one skilled in the art will appreciate, the cost of a server system is dependent on several factors, such as the hardware resources, the operating system software and the application software required to provide the desired server functions. As is well understood, hardware costs increase as more resources are added to a server machine. Thus, if a web server machine comprises a single processor while the application servers comprise multiple processors and coprocessors, the hardware cost of an application server will typically be higher than the web server. Application software costs can also be higher for an application server because several types of application software programs must be available to the client. Accordingly, it is usual for an application server machine to be more costly to acquire and to operate.

To illustrate, if the normalized cost of web server 312 is set to one, and the normalized cost of application server 314 is set to two, or twice as expensive, the cost for server system 320 is higher than the cost for server system 310. It being appreciated that the cost of three application servers (normalized cost of 6) plus the cost of two web servers (normalized cost of 2) is higher than the normalized cost of two application servers and three web servers. Although both server systems 310 and 320 meet the requirements of the SLA (that is both are feasible), only the server system 310 is both feasible and optimal (lowest cost) and it is therefore preferred for the given set of conditions. Thus, the present invention may identify the feasible and optimal, rather than merely a feasible, server machine allocation scheme such that operating costs are minimized.

Advantageously, embodiments of the present invention predict a server system's average response time and, based on the prediction, provides a systematic method to determine the allocation of machines in a horizontally scalable server system. A server system is horizontally scalable when the number of server machines can be either increased or decreased to respond to the number of transaction requests or the workload handled by the server system. For example, if transaction requests increase for one of the contracting parties, additional web server machines 322 can be allocated from pool 130 and added to the web tier operated by the system administrator for the contracting party.

As illustrated in FIGS. 3A and 3B, server pool 330 comprises web servers 322A-322n, application servers 324A-324n and database servers 326A-326n. When transaction requests increase, an additional web server machine, such as web server 324A, may be added to the web tier for the contracting party such as is illustrated in FIG. 3A.

In the embodiment shown in FIG. 3B, an additional web server machine 324A and application server machine 326A are allocated from pool 130 to the respective tiers in order to meet SLA requirements. While the configuration of server system 320 will typically have a higher cost, it may be the optimal configuration in view of the demands required by the contracting party.

It will be apparent from the above description that the additional server machines in server pool 330 provide the ability to increase the number of server machines at each tier of the server system 310 or 320 to meet the requirements of each SLA. It will be further apparent that when transaction requests decrease for server system 310 or 320, one or more of the server machines 322A, 324A, 312 or 314 can be allocated, or returned, to pool 330 for use by other contracting parties.

Further, the system operator and the contracting party can predict the cost associated with handling the changes in demand and plan the operation of their business in an improved and more efficient manner.

It is to be understood that a plurality of clients 328 may be communicatively coupled to web servers 312 while other server system components such as load balancers, network components and server system management systems or programs which well known in the art are neither illustrated nor described in detail to avoid obscuring aspects of embodiments of the present invention. Clients 328, which may be operated by the UDCs, ASPs or their clients, are typically computers or processor-based devices that generate transaction requests and provide a human interface for accessing and receiving the results of the transaction requests. Although clients 328 are shown as separate from the server machines 312, 314 and 316, it is to be understood that clients 328 may also be embodied as computer programs executed by one or more server machines.

It is to be also understood that each server machine on each tier will typically share a common architecture and operating parameters, such as the same operating system, processor, memory configuration and the like, while server machines on the other tiers may have different architectures and operating parameters. Thus, the acquisition and operating costs related to each type of server machine creates an incentive to minimize the weighted sum of the costs of the various types of server machines. As used herein, the weight factor reflects the costs associated with each type of server machine used at each tier.

The phrase "transaction requests" or "requests" for various embodiments of the present invention means any communicative request or activity between client computers and server system 310 or 320 or between server machines. As the number of transaction requests increase, system utilization rates increase until the server system reaches a state where additional requests must be queued for an unacceptable time. When high levels of transaction activity occurs, the system operator needs to dynamically allocate an adequate number of server machines to one or more tiers to ensure the average response time conforms to the requirements of each SLA.

Also as used herein, a "server machine" refers to a computer or other device communicatively connected to a network that manages specific network resources. For example, a database server is a computer system that processes database queries to a database stored on a storage device or distributed among many storage devices. A computer that delivers or serves up Web pages is often referred to as a Web server.

While the server systems illustrated in FIGS. 3A and 3B both comprise three tiers, correctly determining the number of servers to allocate to each tier may achieve the lowest operating system cost while meeting SLA requirements. Rather than relying on a lengthy simulation to model the system, embodiments of the present invention utilize algorithms that use typically easily obtained input parameters that may be rapidly solved.

In one embodiment, a computer program executing on client computer is operatively coupled to the server system to receive the input parameters. Other embodiments of the present invention may comprise a computer code that is incorporated into any commercially available server management tool and executed by a computer that monitors operation of the server system. Because input parameters are typically readily obtainable from server system management tools and the algorithms are rapidly solvable, the composition of the server system may be dynamically configured to optimize performance and costs. Further, dynamically allocating resources enables a UDC or ASP to adjust capacity as demand changes over time. Dynamic resource allocation allows flexible service level agreements, which is of critical importance in an environment where peak workload is much greater than the normal workload. However, when a demand surge is encountered, user needs must be translated into logical configurations and physical resources assigned to the logical configuration to meet the resource requirements of the application. The resource requirements may be therefore determined so that SLA requirements may be met.

Figure 4:
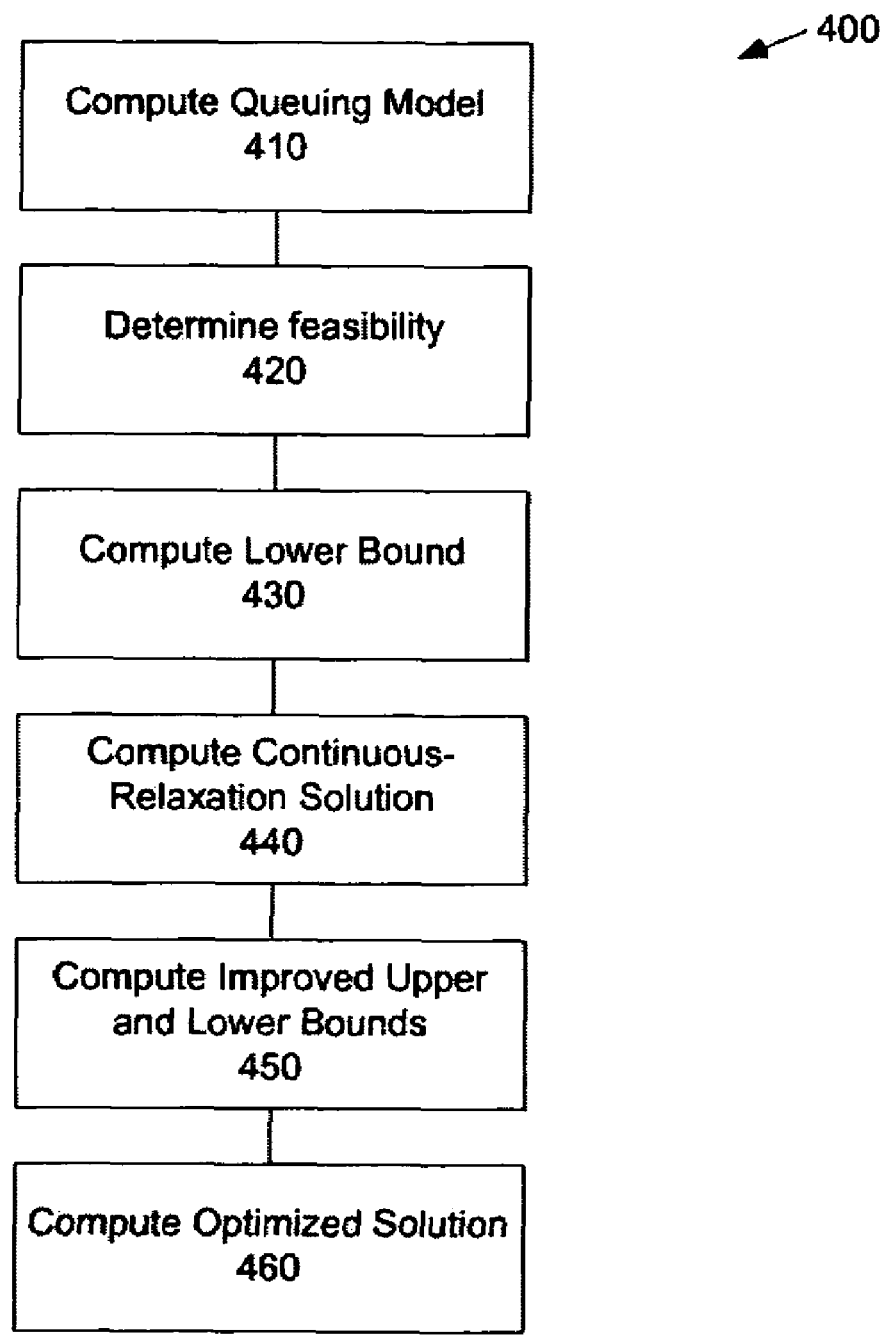
FIG. 4 is a flow diagram of a representative process for finding the feasible and optimal number of server machines for a multiple tier server system in accordance with an embodiment of the present invention.

Referring now to FIG. 4, there is seen an embodiment 400 of the invention illustrated as comprising a queuing model 410 that provides an expected average response time as a function of transaction requests and the amount of resources allocated. Given the average response time and the SLA requirement, a feasibility test 420 is performed. Once it is determined that the server system can meet the SLA requirement, that is, the problem is feasible, a lower bound on the number of server machines is computed using a linear objective function 430 and a nonlinear constraint 440, with general integer decision variables. To facilitate real-time allocation results, upper and lower bounds 450 are computed prior to computing a generally optimized solution using an optimization model 460. Optimization model 460 typically provides not only a feasible solution but also a solution that may result in the lowest cost by calculating an optimal number of server machines allocated to each tier.

The Queuing Model

The queuing model performs the initial task, which requires the generation of a prediction of system performance. The queuing model is non-iterative and provides a prediction of the queuing time of the server system or the average response time. In the queuing model, each server machine is modeled as a processor-sharing queue with a single critical resource. In one embodiment, the critical resource is the CPU cycle time and the model assumes that all server machines on a tier are identical and that workload is shared equally among all the server machines on a given tier. In other embodiments, additional terms may be added to the model to compensate for different server machine types such as will become apparent to one of ordinary skill in the art.

The non-iterative queuing model predicts the average server system response time in accordance with a formula, which is shown for a three-tiered server system as follows:

$$E[R] = \frac{E[S_{web}]}{1 - \lambda_{web}E[S_{web}]/N_{web}} + \frac{E[S_{App}]}{1 - \lambda_{App}E[S_{App}]/N_{App}} + \frac{E[S_{DB}]}{1 - \lambda_{DB}E[S_{DB}]/N_{DB}} \quad (1)$$

where $\lambda_{Web}$, $\lambda_{App}$ and $\lambda_{DB}$ are the arrival rates of transaction requests for CPU cycles into the web, application and database server tiers, respectively; $E[S_{Web}]$, $E[S_{App}]$ and $E[S_{DB}]$ are the average service demand at the web, application and database server tiers, respectively, averaged over all request types and including multiple passes of processing; and $N_{Web}$, $N_{APP}$ and $N_{DB}$ are the number of servers allocated at the web, application and database server tiers, respectively.

As used herein, the arrival rate of new requests at each tier is the sum of all client transaction requests that require processing at the respective server tier. Because the response time is the sum of response time for each tier, equation 1 may be extended from three to n tiers such as may be required for specific applications and it is to be understood that the number of tiers is an engineering decision. Accordingly, embodiments of the present invention are not to be limited to the described three-tier embodiment.

The queuing model is designed in part so that response times may be predicted in real-time. The inputs are the arrival rates, $\lambda$, which is a measure of server machine average throughput rate, the number of server machines, N, at each tier, and the average service time (e.g., in seconds, and which also may be termed "service demand"), E[S], which can be computed from the measured utilization rates of the critical resource. For example, E[S] may be a measure of CPU cycles required per transaction request although the actual unit for resource requirements will depend on the actual manner in which resource capacity is measured.

The average service time may be calculated through the following relationship:

$$E[S_n] = U_n/(\lambda_n/N_n) \quad (2)$$

where $U_n < 1$ is a unit-less measure of the average utilization rate expressed in a single-machine percentage, and $(\lambda_n/N_n)$ is the per-machine average throughput rate.

It has been found that the average response time as provided by Equation 1 when compared to the measured response time data recorded from a tiered server system comprising a web server, two application servers and a database server, under various test conditions and in multiple observation periods, were found to have a relative predictive error ranging from about 4% to about 27%. The measured response time data included CPU utilization percentages for all machines in five-minute intervals and under various workload scenarios consisting of different intensity of requests and different mix percentages of request types.

The average response time result is used as an input in a subsequent optimization routine that determines the optimal resource allocation frequently and quickly in real-time.

Resource Optimization

To minimize system operating and physical resource costs, resource optimization seeks to minimize the total weighted cost of the server system subject to the constraint that the average server system response time be less than or equal to an average response time, T, which may be specified in an SLA. As such, a feasibility test is helpful in determining whether the resource optimization problem will be successful.

A mathematical representation of the optimization objective and constraints for a physical server system having n tiers is:

Condition 1

$$\text{Minimize } h_1N_1 + h_2N_2 + \ldots + h_nN_n \text{ Subject to } E[R] \leq T; \quad (3)$$

$N_1, N_2, \ldots, N_n$ are all positive integers.

where $h_1, h_2, \ldots h_n$ are weights reflecting the cost, in dollars, of different types of servers located at each of the n different tiers; E[R] is given by the queuing formula of Equation 1, T is the average response time which may be specified in a SLA, and $N_1, N_2, \ldots, N_n$ are the number of machines to be assigned to each of the n tiers, respectively. Weights $h_1, h_2, \ldots h_n$ are preferably positive and reflect normalized cost between different types of server machines. Costs include both replacement and operating costs. For example, if the server machines on the third tier are three times more expensive than the server machines on tier 1, then $h_3 = 3*h_1$.

Substituting for E[R] in Condition 1 and solving for a three tier server system having a web tier, an application tier and a database tier, provides:

Condition 2

$$\text{Minimize: } h_{web}N_{Web} + h_{App}N_{APP} + h_{DB}N_{DB}$$

Subject to:

$$\frac{E[S_{web}]}{1 - \lambda_{web}E[S_{web}]/N_{web}} + \frac{E[S_{App}]}{1 - \lambda_{App}E[S_{App}]/N_{App}} + \frac{E[S_{DB}]}{1 - \lambda_{DB}E[S_{DB}]/N_{DB}} \leq T; \quad (4)$$

$N_{Web}$, $N_{App}$, $N_{DB}$ are positive integers.

If costs are difficult to ascertain, a simplified embodiment provides for all weights to be set such that $h_{web} = h_{App} = h_{DB} = 1$ to minimize the total number of server machines in a system.

It should be noted that when the number of server machines is increased, the average (or aggregate) arrival rates of new requests into the web ($\lambda_{Web}$), application ($\lambda_{App}$) and database ($\lambda_{DB}$) server tiers, respectively, and the average (or aggregate) service demands at the web ($E[S_{web}]$), application ($E[S_{App}]$) and database server tiers ($E[S_{DB}]$), respectively, remain the same. Thus, the conditions of Condition 2 provide a test to determine whether a n-tiered system is able to satisfy the given average response time, T, specified in the SLA for the average arrival rate and service demands. A necessary and sufficient (if and only if) test (i.e., a feasibility test) may be expressed as:

$$E[S_1]+E[S_2]+\ldots+E[S_n]<T \tag{5}$$

Once it is shown that at least one combination of server machines can meet the SLA requirement (i.e., the problem is feasible), then the allocated resources may become optimized by minimizing the weighted costs subject to the condition that average system response time be less than or equal to the SLA requirement. A first step in determining the minimization is to determine the fewest number of machines that can meet the feasibility test. This is done by computing a lower bound of the number of server machines for each tier of the server system.

In general, a lower bound (limit) to the possible values of $N_1, N_2, \ldots, N_n$ is given mathematically as:

$$N_i^{LB} = \left\lceil \frac{u_i\left(s_i + T - \sum_{j=1}^{n} s_j\right)}{T - \sum_{j=1}^{n} s_j} \right\rceil, \text{ for } i = 1, 2, \ldots n, \tag{6}$$

where $s_i = E[S_i]$, $u_i = \lambda_i E[S_i]$, and $\lceil x \rceil$ stands for the smallest integer greater than or equal to x; and i represents the respective tiers comprising the server system.

Often one tier of the server system comprises an expensive mainframe computer functioning as a database server. In such circumstances, the number of database server machines is fixed at one. Accordingly, the optimization of the three-tier server system reduces to a two-tier problem and Condition 2 can be rewritten as:

Condition 3

Minimize: $h_{Web}N_{Web} + h_{App}N_{App}$

Subject to:

$$\frac{s_{Web}}{1 - u_{web}/N_{web}} + \frac{s_{App}}{1 - u_{App}/N_{App}} \leq T; \tag{7}$$

$N_{Web}$, $N_{App}$ are positive integers;

where $S_{web} = E[S_{web}]$, $u_{web} = \lambda_{web}E[S_{web}]$, $s_{App} = E[S_{App}]$ and $u_{App} = \lambda_{App}E[S_{App}]$ are input parameters. It will be appreciated that the utilization term, u, can be interpreted as an expression of workload. For example, when the aggregate processor workload on the web server tier is equivalent to 1.5 web server machines working full time at 100% utilization then $u_{web} = 1.5$. The non-negativity constraints $N_{Web}$, $N_{App}$ positive integers can also be replaced by a tighter $N_{web} \geq \max(u_{web}, 1)$, indicating that Nweb≧ and Uweb and Nweb must also be at least 1, and $N_{App} \geq \max(u_{App}, 1)$. The basic tradeoff expressed by the above optimization is to balance fewer expensive machines with a longer response time against a greater number of less expensive machines with a corresponding shorter response time.

The two-tier problem is feasible if and only if the proposition of Equation 8 is true. Specifically:

$$S_{web} + S_{App} \leq T \tag{8}$$

As will be appreciated, the proposition is true for a very large number of server machines. Specifically, Equation 7 of Condition 3 reduces to:

$$S_{web} + S_{App} \leq T \text{ for } N_{Web} \to \infty \text{ and } N_{App} \to \infty \tag{9}$$

Since large $N_{Web}$ and $N_{APP}$ can readily satisfy the constraint of Equation 9, the two-tier problem is feasible. Further, if the problem is feasible, then there must exist some positive integers, $N_{Web}(0)$ and $N_{App}(0)$ such that:

$$s_{web} + s_{App} \leq \frac{s_{Web}}{1 - u_{web}/N_{web}(0)} + \frac{s_{App}}{1 - u_{App}/N_{App}(0)} \leq T; \tag{10}$$

The next task is to find the lower bound on the feasible $N_{Web}$ and $N_{App}$ using the relationship set forth in Equation 11:

$$N_{web} > \frac{u_{web}(T - s_{App})}{T - s_{web} - s_{App}}; N_{App} > \frac{u_{App}(T - s_{Web})}{T - s_{web} - s_{App}}; \tag{11}$$

Proof of the feasibility condition is shown in Equations 12, 13 and 14 for $N_{Web}$. Proof for $N_{APP}$ is found by similar derivation.

$$\frac{s_{Web}}{1 - u_{web}/N_{web}} + \frac{s_{App}}{1 - u_{App}/N_{App}} \leq T; \tag{12}$$

$$\frac{s_{Web}}{1 - u_{web}/N_{web}} \leq T - S_{App}; \tag{13}$$

$$N_{web} > \left\lceil \frac{u_{web}(T - s_{App})}{T - s_{web} - s_{App}} \right\rceil \tag{14}$$

where the function enclosed within symbol "⌈ ⌉" means the smallest integer greater than or equal to the value of the right side term of the inequality.

In one embodiment, $N_{Web}$ and $N_{App}$ are restricted to integers. By way of example, if $N_{Web} = 1.4$, then two server machines will be allocated to the web tier. In other embodiments, the SLA may allow pricing for partial utilization of the server machine. In such embodiments, the result from Equation 14 provides finer granularity in pricing models.

The initial bounds on $N_{Web}$ and $N_{App}$ facilitate the numerical search for the optimal number of server machines to allocate to each tier. However, the numerical search will have to enumerate all integer pairs ($N_{Web}$, $N_{App}$) that satisfy Equation 11. Accordingly, it is often helpful to relax the restrictions using a continuous-relaxation model of the optimization problem. The continuous-relaxation model is useful for determining the lower and upper bounds. Advantageously, the continuous-relaxation model version has a closed form solution in that the bounds are permitted to be fractional. Advantageously further, the continuous-relaxation model identifies the shadow price of adding additional resources to meet the required response time. The shadow price is typically a measure of dollars per second required to achieve the average response time specified in the SLA.

The solution to the continuous-relaxation model of the mathematical optimization system for an n tier server system may be generalized as follows:

1. The n-tier problem is feasible if and only if:

$$\sum_{i=1}^{n} s_i < T \qquad (15)$$

2. The feasible Ni satisfy:

$$N_i > \frac{u_i\left(s_i + T - \sum_{j=1}^{n} s_j\right)}{T - \sum_{j=1}^{n} s_j}, \text{ for } i = 1, 2, \ldots, n, \qquad (16)$$

3. The n-tier problem has the following continuous-relaxation model solution:

$$N_i^c = u_i + \sqrt{\gamma s_i u_i / h_i}; \qquad (17)$$

where $\gamma > 0$ is the shadow price of the expected response time and is give by:

$$\sqrt{\gamma} = \frac{\sum_{i=1}^{n} \sqrt{h_i s_i u_i}}{T - \sum_{i=1}^{n} s_i}; \text{ and} \qquad (18)$$

4. The objective function value is:

$$Z^c = \sum_{i=1}^{n} h_i u_i + \sqrt{\gamma} \sum_{i=1}^{n} \sqrt{h_i s_i u_i} \qquad (19)$$

where the notation is as previously defined with respect to Condition 1 and $\gamma$ is the shadow price necessary to achieve an incremental decrease in average response time.

For the two-tiered problem, the continuous-relaxation model has the optimal solution as set forth in Equations 20-23.

$$N_{Web}^c = u_{web} + \sqrt{\gamma s_{Web} u_{Web} / h_{Web}}; \qquad (20)$$

$$N_{App}^c = u_{App} + \sqrt{\gamma s_{App} u_{App} / h_{App}}; \qquad (21)$$

where the shadow price of the required average response time $\gamma > 0$ is given by:

$$\sqrt{\gamma} = \frac{\sqrt{h_{Web} s_{Web} u_{Web}} + \sqrt{h_{App} s_{App} u_{App}}}{T - s_{Web} - s_{App}}; \qquad (22)$$

and the objective function value is given by Equation 23. The goal of an objective function is to minimize or maximize the value of the function subject to constraints. The problem is to find the optimal values for those choice variables:

$$Z^c = h_{Web} u_{Web} + h_{App} u_{App} + \sqrt{\gamma} (\sqrt{h_{Web} s_{Web} u_{Web}} + \sqrt{h_{App} s_{App} u_{App}}) \qquad (23)$$

Embodiments of the present invention will be illustrated by the following Example by way of illustration only and not by way of any limitation. The following Example is not to be construed to unduly limit the scope of the invention.

EXAMPLE

To illustrate the algorithms to determine the bounds of the feasible solution, let $s_{web} = 0.3$, $s_{App} = 0.5$, $u_{web} = 0.3$, $u_{App} = 0.4$, $T = 1$. Notice that $S_{web} + S_{App} = 0.8$ which is less than T, hence the necessary and sufficient condition for feasibility of the optimization problem is satisfied. The objective then is to find the best of all possible solutions in the feasible region that has the minimum (or the maximum) value of the objective function. From Equation 14, the lower bounds may be found by substitution:

$$N_{Web} > \frac{0.3(1 - 0.5)}{1 - 0.3 - 0.5} = 0.75; \text{ leading to } N_{Web} \geq 1; \qquad (24)$$

$$N_{App} > \frac{0.4(1 - 0.3)}{1 - 0.3 - 0.5} = 1.4; \text{ leading to } N_{App} \geq 2; \qquad (25)$$

If $h_{Web} = 1$, $h_{App} = 2$, then the continuous-relaxation algorithms (Equations 20-23) provide the following bounds for the two-tiered server system:

$$\sqrt{\gamma} = \frac{\sqrt{1 \cdot 0.3 \cdot 0.3} + \sqrt{2 \cdot 0.5 \cdot 0.4}}{1 - 0.3 - 0.5} = 4.6623; \qquad (26)$$

$$N_{Web}^c = 0.3 + 4.6623\sqrt{0.3 \cdot 0.3/1} = 1.6987; \qquad (27)$$

$$N_{App}^c = 0.4 + 4.6623\sqrt{0.5 \cdot 0.4/2} = 1.8743; \qquad (28)$$

$$Z^C = 1 \cdot 0.3 + 2 \cdot 0.4 + 4.6623(0.3 + 0.6325) = 5.4473. \qquad (29)$$

The integer-optimal solution (found through enumeration) for both the web tier and the application tier is two, with achieved average response time of 0.978 seconds, which better than the required T=1 second. Thus, the optimized server system has two relatively inexpensive web server on the web tier, two moderately expensive application servers on the application tier and one very expensive database server on the database tier. The objective function value of 6 is worse than 5.4473 of the continuous solution.

The continuous-relaxation model solution of the two-tier problem has some interesting properties. The shadow price of the required average response time is the increase in the objective function value (cost) per unit of decrease on the response time; for example, "$\gamma = \$20$/second" denotes that each second in decreased response time will cause an approximately $20 increase in the total objective function value or cost. It will be appreciated that once the shadow price is known, it is possible to provide dynamic pricing in the SLA such that the output of the mathematical optimization model may have pricing implications on the SLAs. It will also be appreciated that the shadow price is related to a critical resource (that is, the response time, T) by the following relationship:

$$\gamma \propto 1/[T - (S_{web} + S_{App})]^2 \qquad (30)$$

where $\propto$ indicates "is proportional to."

It will be appreciated that the shadow price decreases rapidly as the allowable response time increases. However, the number of machines at each tier, as well as the objective function value or cost, is approximately inversely proportional to the required response time:

$$N_{Web}{}^c \propto 1/(T-(S_{web}+S_{App})) \text{ and}$$

$$Z^c \propto 1/(T-(S_{web}+S_{App})) \quad (31)$$

Iterative Bounding Procedure

While the continuous-relaxation model provides a relaxation of the integer optimal solution, the integer optimal solutions might be far away from the continuous solutions as given by Equation 17. For example, if the continuous solution is $(N_1, N_2)=(1.44, 1.79)$, the integer optimal solution might be (1, 4). Rounding up each of the continuous $N_i$ will clearly lead to a feasible solution but not necessarily an optimal solution.

Figure 5:
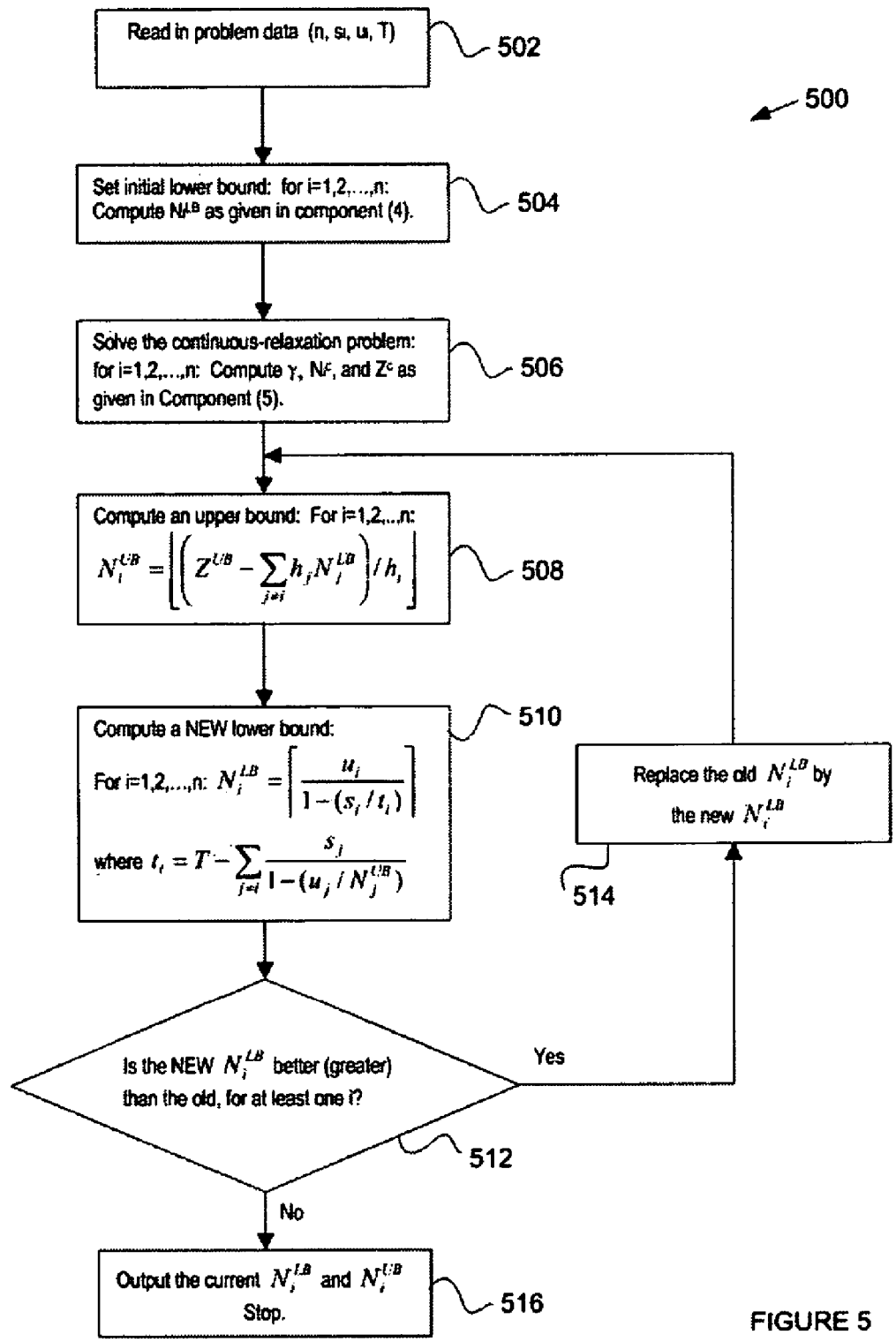
FIG. 5 is a flow diagram of an iterative bounding procedure in accordance with an embodiment of the present invention.

The lower bound on each $N_i$ was found by Equation 6 and can be utilized as the starting values in a numerical search algorithm such as is illustrated in FIG. 5.

An upper bound is found from the set of feasible $N_i$ that satisfies the expected average response time constraint. However, even though the response time strictly decreases for each $N_i$ not all $(N_1, N_2, \ldots N_n)$ will be optimal. Accordingly, to find the upper bound for the optimal allocation, the objective function value provides:

$$\sum_{i=1}^{n} h_i N_i \equiv Z^c \leq Z^{UB} \equiv \sum_{i=1}^{n} h_i \lceil N_i^c \rceil \quad (33)$$

where $Z^{UB}$ is the upper bound to the weighted sum of system cost in dollars, that is, the objective function value.

To further optimize the number of server machines at each tier, the present invention further provides an iterative solution 500 for tightening the bounds, which is illustrated in FIG. 5. At initial step 502, the number of tiers, n, the average service times, $s_i$, the average utilization rate, and the expected service level, T, are acquired. At step 504, an initial lower bound is computed. At step 506, the continuous-relaxation model is computed together with shadow pricing and the objective function value.

Once the continuous-relaxation model is available, an upper bound on the number of server machines for each tier is calculated at step 508 using the formula:

$$N_i^{UB} = \left\lfloor \left(Z^{UB} - \sum_{j \neq i} h N_j^{LB}\right) / h_i \right\rfloor \quad (34)$$

where the symbol "$\lfloor \ \rfloor$" denotes the integer less than or equal to the enclosed function.

Based on the upper bound on the number of server machines, step 501 determines whether there is an improved lower bound in the other tiers. If there is an improved lower bound at any of the other tiers, an iterative loop is entered via steps 512 and 514 to revise the upper bound based on the improved lower bound.

If the lower bound is not improved at step 510, iterative solution 500 then terminates at step 516. Iterative solution 500 provides an optimal integer value for the upper and lower bounds.

Figure 6:
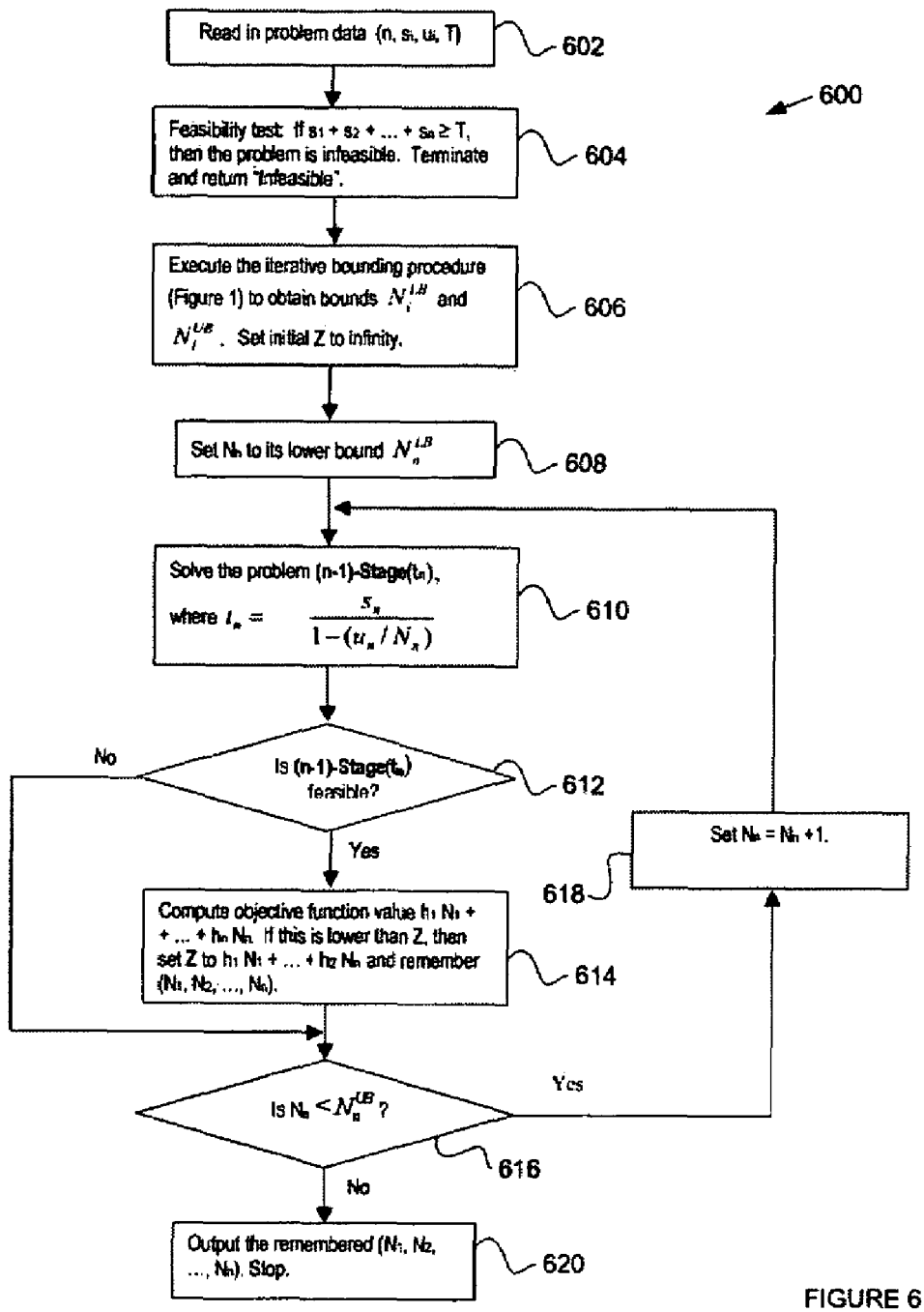
FIG. 6 is a flow diagram of a numerical search algorithm for solving an n-tier problem that may be employed to implement embodiments of the present invention.

For the n-tiered problem with a given required average response time T as specified in the SLA, recursive algorithm 600, illustrated in FIG. 6, determines the optimal number of server machines on each tier such that the server system cost is minimized. Specifically, the recursive algorithm 600 is a numerical search algorithm that finds the optimal $N_1$, $N_2, \ldots, N_n$ to minimize $h_1 N_1 + h_2 N_2 + \ldots + N_n$ and to minimize $h_1 N_1 + h_2 N_2 + \ldots + N_n$ for a given average response time T that may be required in the SLA.

At initial step 602, the number of tiers, n, the average service times, $s_i$, the average utilization rate, and the expected service level, T, are acquired. At step 604, the feasibility test determines whether the problem is feasible or not. If it is not feasible, no further processing is required. However, if the problem is feasible, the solution to the continuous response model is computed and the iterative bounding algorithm, shown in FIG. 5, is executed to determine the upper and lower bounds for each tier in step 606. The objective function value Z is initially set to infinity.

In step 608, the number of server machines, $N_n$, is set to the lowest bound. In steps 610-618, recursive algorithm 600 loops for each $N_i$ from its lower bound to its upper bound and calculates the smallest $N_{i+1}$ that still makes the required response time, T, feasible. After computing the result of the equation of step 610, step 612 checks if the returned solution is feasible.

If the solution is feasible at step 612, then algorithm 600 computes the objective function value and determines whether the calculated objective function value is less than the previous calculated objective function value at step 614. If the upper bound of the server machines has not been reached, algorithm 600 then proceeds to allocate the number of server machines at the next tier as indicated at step 618.

If the solution is not feasible at step 612, then algorithm 600 proceeds to step 616 to determine whether the number of server machines exceed the upper bound. If the upper bound has not been reached, algorithm 600 then proceeds to allocate the number of server machines at the next tier as indicated at step 618.

Figure 7:
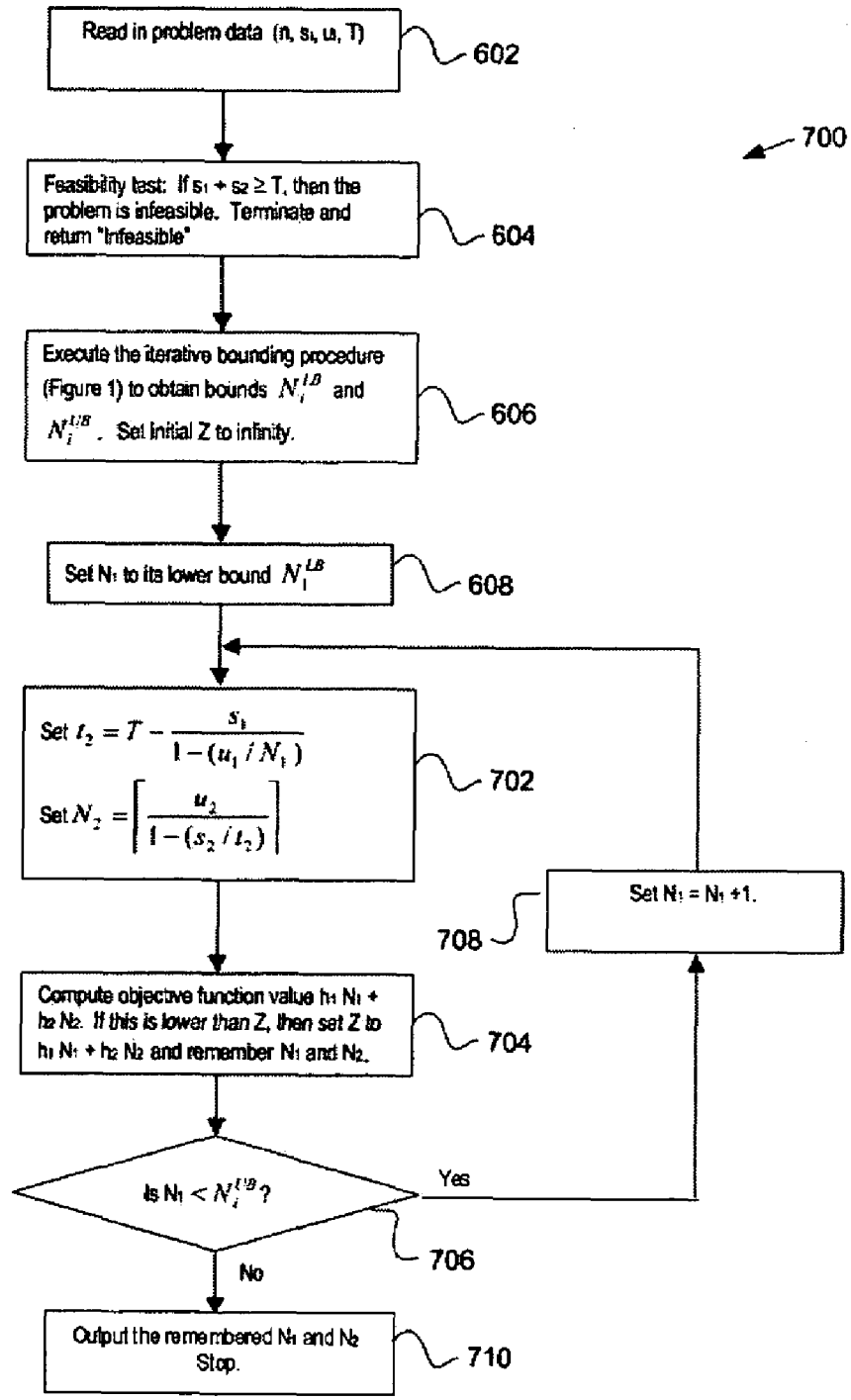
FIG. 7 is a flow diagram of a numerical search algorithm for solving a two-tier problem that may be employed to implement embodiments of the present invention.

By way of example, algorithm 600 may be simplified if the number of tiers is limited n=2. A simplified algorithm 700 is illustrated in FIG. 7. Initial steps, 602-608 are the same as described with respect to the n-tier algorithm (FIG. 6). However, step 702-708 operate to loop over $N_1$ from its lower bound to its upper bound. For any fixed $N_1$, the smallest $N_2$ that still achieves the required response time, T, feasible is computed so that the sum of the terms in Equation 7 is less than the required response time. There is no need to continue computing the value of any other $N_2$, as any $N_2$ less than that of step 702 will be infeasible, and any $N_2$ greater than that of step 702 will result in a higher objective function value. The $(N_1, N_2)$ obtained from step 702 forms the integer boundary of the feasible region. It should be noted that it is possible to terminate algorithm 700 early if $N_2$ from step 702 turns out to be equal to the lower bound because any higher $N_1$ (and same or higher $N_2$) will only lead to higher objective function value.

With the present invention, it is possible to specify the service level requirement in critical quintiles of the response time, such as "95% of the response times to be less than 5 seconds." If the response time is exponentially distributed, then the requirement:

$$Pr\{R \leq Q\} \geq 0.95 \quad (35)$$

is equivalent to:

$$E[R] \leq \alpha \cdot Q \quad (36)$$

Where:

$$\alpha = 1/[-\ln(1-0.95)] \approx 0.33381 \quad (37)$$

It will be appreciated that in the case of exponentially distributed response time, the response time quantiles requirement can be exactly translated into a requirement on the average response time. When the response time is generally distributed (e.g., normally distributed) rather than exponentially distributed, Markov's inequality may be employed to approximate the inequality:

$$1-(E[R]/Q) \geqq 0.95 \quad (38)$$

By setting $T \cong 0.05$ Q, the resulting optimization model would be identical to the exponentially distributed response time. The inequality:

$$1-(E[R]/Q) \geqq 0.95 \quad (39)$$

guarantees the satisfaction of the requirement $Pr[R \leqq Q] \geqq 0.95$. Actual test data indicates that Markov's inequality is a loose inequality because the actual achieved response time performance when using the Equation 38 is much better than predicted. Accordingly, it will be appreciated that the actual probability $Pr\{R \leqq Q\}$ is much greater than 0.95.

As discussed above, embodiments of an optimization model typically includes a computationally simple queuing model that may efficiently provide the average response time of transaction requests to an n-tier server system. The optimization model in part determines the number of servers at each of the n tiers, reflecting cost differentials between the tiers. The optimization model may designate fewer expensive machines together with more numerous inexpensive machines to achieve the overall average response time.

Embodiments include a continuously variable version of the optimization model including a closed form solution that provides fractional ideal server machine configurations. Because the ideal number of server machines at each tier is inversely proportional to the required average response time T, it is possible to consider the sensitivity of the ideal $N_i^c$ to other problem parameters such as $h_i$, $s_i$ and $u_i$, by taking partial derivative of $N_i$ with respect to these parameters in Equation 8 and recognizing that the shadow cost is also a function of $h_i$, $s_i$ and $u_i$. In addition, embodiments of the optimization model may be applicable to any SLA expression that can be translated into the average response time.

Because the input parameters are typically readily obtainable and the algorithms are rapidly solvable, the configuration of the server system may be dynamically changed to optimize performance and costs. Dynamic allocation of server resources enables both system operators and contracting parties, such as a UDC or ASP, to access available capacity in the server system as demand changes over time. Dynamic resource allocation allows flexible service level agreements in an environment where peak workload is much greater than the normal workload. However, when a "capacity on demand" surge is encountered, user needs must be translated into logical configurations and physical resources assigned to the logical configuration. The optimal resource requirements of an application under a given workload is efficiently determined so that SLA requirements are met while typically minimizing costs.

The server system may comprise any suitable computer server executing an operating system and application program. In an embodiment of the invention illustrated in FIGS. 3A and 3B, the server system may include a plurality of server machines in addition to the number illustrated, it being understood that the server machines may be horizontally configured for each contracting party. Thus for an embodiment of the invention, the server system, in combination with any suitable communication network, load balancer and control programs, communicate with a plurality of clients each of which communicates transactions requests to the server system.

A "server" or "server machine" for purposes of embodiments of the present invention may be any device having a processor. By way of example only, a "server machine" may be a mainframe computer, a personal computer executing server software, a server, or any of the like. By further way of example only, a "server machine" is merely representative of any type of computer-based product, and so forth. Further, a "server machine" may be any suitable server (e.g., database server, disk server, file server, network server, terminal server, etc.), including a device or computer system that is dedicated to providing specific facilities to other devices attached to the communication network. A "server machine" may also be any processor-containing device or apparatus, such as a device or apparatus containing CPUs or processors. A "server machine" further includes a software program running on a hardware device, representing a virtual computing machine.

A "processor" includes a system or mechanism that interprets and executes instructions (e.g., operating system code) and manages system resources. More particularly, a "processor" may accept a program as input, prepares it for execution, and executes the process so defined with data to produce results. A processor may include an interpreter, a compiler and run-time system, or other mechanism, together with an associated host computing machine and operating system, or other mechanism for achieving the same effect. A "processor" may also include a central processing unit (CPU) that is a unit of a computing system that fetches, decodes and executes programmed instruction and maintains the status of results as the program is executed. A CPU is the unit of a computing system that includes the circuits controlling the interpretation of instruction and their execution.

A "computer program" may be any suitable program or sequence of coded instructions that are to be inserted into a computer, well know to those skilled in the art. Stated more specifically, a computer program is an organized list of instructions that, when executed, causes the computer to behave in a predetermined manner. A computer program contains a list of ingredients (called variables) and a list of directions (called statements) that tell the computer what to do with the variables. The variables may represent numeric data, text, or graphical images.

A "computer-readable medium" for purposes of embodiments of the present invention may be any medium that can contain, store, communicate, propagate, or transport a program (e.g., a computer program) for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory.

Reference throughout the specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A server system comprising:
   at least two scaleable tiers of server machines;
   a server pool including plural spare server machines;
   means for computing an average response time for the server system to respond to transaction requests at the two scaleable tiers of server machines; and
   means for increasing a number of server machines processing transactions for each of the two scaleable tiers of server machines by allocating the spare server machines to process a portion of the transactions, wherein the spare server machines are allocated to process a portion of the transactions when the average response time for the server system to respond to the transaction requests is greater than or equal to a specified average response time, wherein said means for computing further comprises a non-iterative queuing model for predicting the average response time for the server system in response to measured arrival rates of transaction requests into each of the two scaleable tiers of server machines, an average service demand at each of the two scaleable tiers of server machines, and a number of servers allocated to each of the two scaleable tiers of server machines.

2. The server system of claim 1 further comprising means for determining costs associated with allocating the number of server machines at each of the two scaleable tiers of server machines.

3. The server system of claim 2 wherein said means for determining further comprises means for minimizing costs associated with allocating an optimized number of server machines at each of the two scaleable tiers of server machines.

4. The server system of claim 3 wherein said means for minimizing comprises:
   means operatively coupled to said server system for receiving input parameters and for solving:

$$\sqrt{\gamma} = \frac{\sum_{i=1}^{n} \sqrt{h_i s_i u_i}}{T - \sum_{i=1}^{n} s_i};$$

where: $\gamma$ is a shadow price of the average response time; $h_1, h_2, \ldots h_n$ are weights reflecting a cost of different types of servers located at each of the two scaleable tiers of server machines; s is an average service time; u is a measured average utilization rate expressed in a single-machine percentage; and T is the average response time.

5. The server system of claim 1, wherein the average response time is determined by examining a time that the transaction requests are pending at each of the two scaleable tiers of server machines.

6. The server system of claim 1 further comprising:
   a contractual relationship between a system operator and at least one contracting party; and
   means for adjusting prices charged by said system operator to at least one third party in response to a change in an allocation of server machines in each of the two scaleable tiers of server machines.

7. A method for allocating a server machine to at least two tiers of a server system, said method comprising:
   computing, by a computer, an expected average response time as a function of transaction requests and an amount of resources allocated to each of the two tiers of the server system;

determining whether an optimization problem is feasible;

computing a lower bound and an upper bound on a number of server machines at each of the two tiers of said server system required to meet the average response time;

computing a solution specifying a number of server machines allocated to each of the two tiers of said server system;

computing an average time that transaction requests are pending at each of the two tiers;

automatically increasing the number of server machines, from a pool of server machines, allocated to one of the two tiers at a point in time when the average time the transaction requests are pending at the one of the two tiers is greater than or equal to a pre-determined limit; and predicting, with a non-iterative queuing model, an average server system response time in response to measured arrival rates of transaction requests into said two tiers of server machines, an average service demand at said two tiers of server machines; and a number of servers allocated to said two tiers of server machines.

8. The method of claim 7 wherein said computing an expected average response time further comprises:

obtaining at least one input value for an average arrival rate of transaction requests into each of the two tiers of said server system;

obtaining at least one input value for an average service demand at each of the two tiers of said server system; and obtaining at least one input value for the number of server machines allocated at each of the two tiers of said server system.

9. An assembly for allocating server machines in a server system comprising:

at least two tiers of server machines;

a pool of spare server machines that process transactions for the two tiers of server machines;

means for computing an average response time for said two tiers of server machines to respond to a plurality of transaction requests; and means for increasing and decreasing a number of server machines from said pool that process transactions for said two tiers of server machines when average response times for processing transactions at the two tiers of server machines exceed a specified average response time, wherein said means for computing further comprises a non-iterative queuing model for predicting an average server system response time in response to measured arrival rates of transaction requests into said two tiers of server machines, an average service demand at said two tiers of server machines, and a number of servers allocated to said two tiers of server machines.

10. The assembly of claim 9, wherein the average response time is determined by examining a time that the transaction requests are pending at the two tiers of server machines.

11. The assembly of claim 9 further comprising:

a contractual relationship between a system operator and at least one contracting party; and means for adjusting prices charged by said system operator to said at least one contracting party in response to a change in an allocation of server machines in said two tiers of server machines.

12. A server system comprising:

an open queuing network of multiple server machines with each server machine having a processor-sharing queue with a single critical resource;

at least two tiers of server machines; and a computer-readable medium comprising instructions for:

(i) predicting an average system response time of said multiple server machines based on an arrival rate of transaction requests into each of the two tiers of server machines averaged over all transaction request types and a number of server machines allocated at each of the two tiers of server machines;

(ii) solving a mathematical representation of an optimization objective and constraints of said server system;

(iii) determining a number of server machines for each of the two tiers of server machines in response to said predicted the average system response time;

(iv) automatically increasing the number of server machines, from a pool of server machines, processing transactions for each of the two tiers of server machines at a point in time when an average time that transactions requests are pending at the two tiers of server machines exceeds a threshold; and (v) predicting, with a non-iterative queuing model, an average server system response time in response to measured arrival rates of transaction requests into said two tiers of server machines, an average service demand at said two tiers of server machines, and a number of servers allocated to said two tiers of server machines.

13. The server system of claim 12 wherein said mathematical representation comprises:

a continuous-relaxation model of a mathematical optimization system; and an iterative bounding procedure.

14. The server system of claim 12 wherein said instructions for determining the number of server machines for each of the two tiers of server machines is in response to a predicted average system response time and at least one service level agreement (SLA) requirement.

* * * * *

UNITED STATES PATENT AND TRADEMARK OFFICE
CERTIFICATE OF CORRECTION

| | | |
|---|---|---|
| PATENT NO. | : 7,581,008 B2 | Page 1 of 1 |
| APPLICATION NO. | : 10/706401 | |
| DATED | : August 25, 2009 | |
| INVENTOR(S) | : Alex Zhang et al. | |

It is certified that error appears in the above-identified patent and that said Letters Patent is hereby corrected as shown below:

On the Title page, in field (75), Inventors, in column 1, line 1, delete "Mountain View," and insert -- San Jose, --, therefor.

Signed and Sealed this

Fourth Day of May, 2010

David J. Kappos
*Director of the United States Patent and Trademark Office*